(12) United States Patent
Montag et al.

(10) Patent No.: US 7,471,511 B2
(45) Date of Patent: Dec. 30, 2008

(54) METHOD AND APPARATUS FOR DOCKING A MOBILE INFORMATION HANDLING SYSTEM

(75) Inventors: Bruce C. Montag, Austin, TX (US); Raymond Farrell Dumbeck, Austin, TX (US); Huy Phuong Nguyen, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 385 days.

(21) Appl. No.: 11/334,162

(22) Filed: Jan. 18, 2006

(65) Prior Publication Data

US 2007/0168593 A1 Jul. 19, 2007

(51) Int. Cl.
*G06F 1/16* (2006.01)
(52) U.S. Cl. ................ 361/686; 348/730; 725/139
(58) Field of Classification Search ................ 348/725, 348/730; 725/131, 139; 361/679–687, 724–727; 312/223.1
See application file for complete search history.

(56) References Cited

U.S. PATENT DOCUMENTS

| | | | |
|---|---|---|---|
| 5,793,606 A | 8/1998 | Cubbage et al. | |
| 5,815,735 A | 9/1998 | Baker | |
| 6,208,508 B1 * | 3/2001 | Ruch et al. | 361/686 |
| 6,833,988 B2 | 12/2004 | Kamphuis et al. | |
| 6,963,487 B2 | 11/2005 | Billington et al. | |
| 7,221,410 B2 * | 5/2007 | Choi et al. | 348/725 |
| 7,317,613 B2 * | 1/2008 | Quijano et al. | 361/686 |

* cited by examiner

*Primary Examiner*—Hung V Duong
(74) *Attorney, Agent, or Firm*—Haynes and Boone, LLP

(57) ABSTRACT

A mobile information handling system (IHS) docking apparatus includes a base having a display device. An IHS docking connector is located on the base. A mobile IHS may be secured to the base and connected to the IHS docking connector in order to utilize the mobile IHS as a conventional desktop IHS while reducing the space and cables required by conventional mobile IHS docking stations.

24 Claims, 5 Drawing Sheets

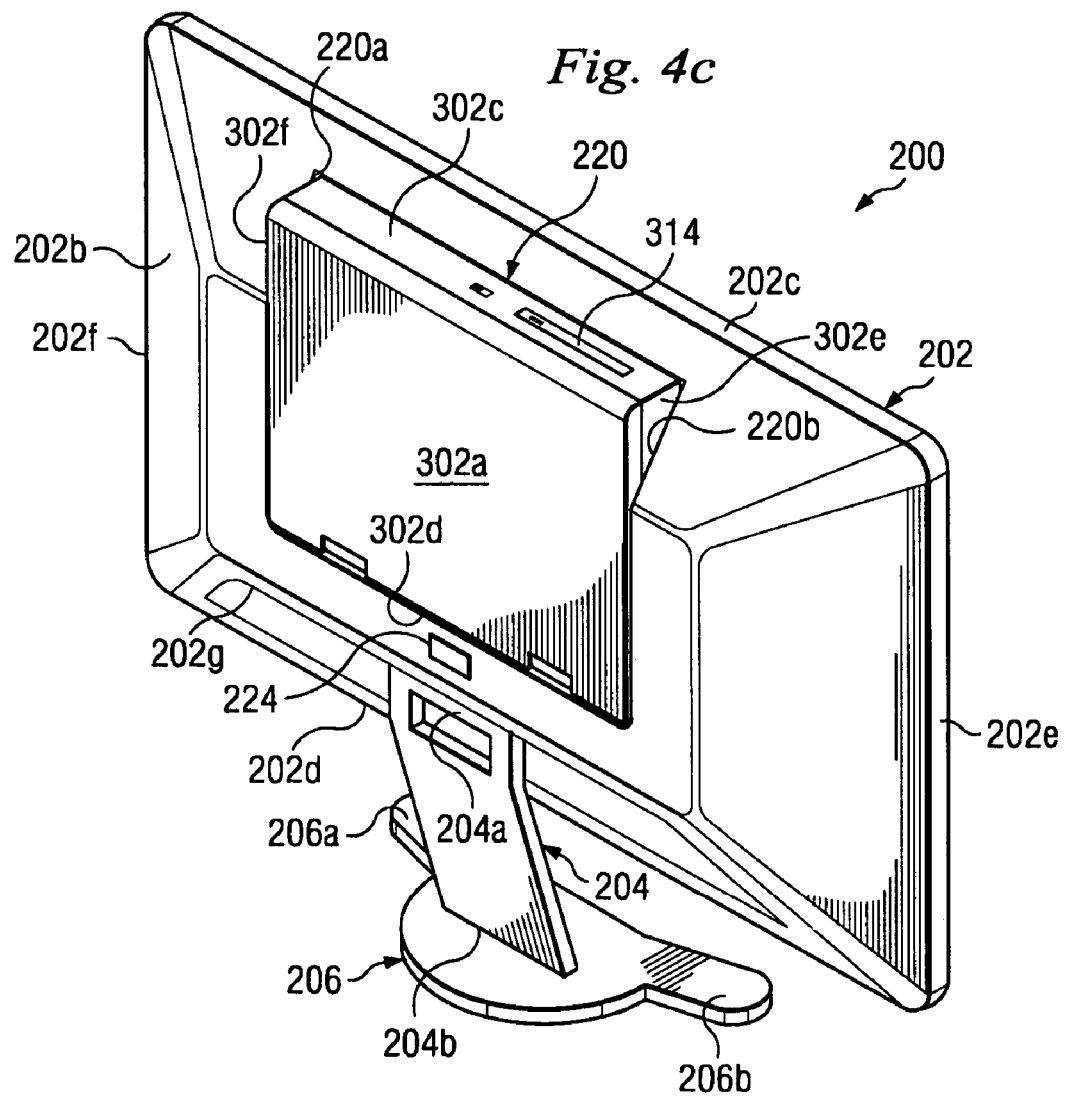

METHOD AND APPARATUS FOR DOCKING A MOBILE INFORMATION HANDLING SYSTEM

BACKGROUND

The present disclosure relates generally to information handling systems, and more particularly to docking a mobile information handling system.

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Mobile information handling systems such as, for example, notebook computers, are becoming more popular as replacements for desktop computers due to their ability to function as mobile entertainment centers for things such as, for example, movies, music, television, and photography. However, when used in a non-mobile manner such as, for example, a desktop computer, it is desirable to connect the mobile information handling system to other devices which make the use of the mobile information handling system more similar to a desktop computer experience.

Typically, to connect the mobile information handling system to other devices, a plurality of separate cables for things such as, for example, video, power, mouse, and keyboard, are provided and used to connect the mobile information handling system to a larger display device and other peripheral devices. This is undesirable because it consumes space and results in a generally cluttered appearance due to the plurality of cables, while requiring the time necessary to connect and disconnect the cables when the desired use of the mobile information handling systems changes.

Some mobile information handling systems connect to a larger display device and other peripheral devices through a docking station. The docking station includes a plurality of separate cables which are always connected to the larger display device and other peripheral devices such that the mobile information handling system may be easily and quickly connected to the larger display device and other peripheral devices by connecting it to the docking station. However, this solution still results in a generally cluttered appearance due to the space necessary to store the docking station and the plurality of cables needed to connect the docking station to the larger display device and the other peripheral devices.

Accordingly, it would be desirable to provide for docking a mobile information handling system absent the disadvantages found in the prior methods discussed above.

SUMMARY

According to one embodiment, a mobile information handling system docking apparatus includes a base comprising a display device and an information handling system docking connector located on the base.

BRIEF DESCRIPTION OF THE DRAWINGS

FIG. 2b is a rear perspective view illustrating an embodiment of the mobile information handling system docking apparatus of FIG. 2a.

FIG. 4c is a perspective view illustrating an embodiment of the mobile information handling system of FIGS. 3a and 3b docked with the mobile information handling system docking station of FIGS. 2a, 2b, and 2c.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Figure 1:
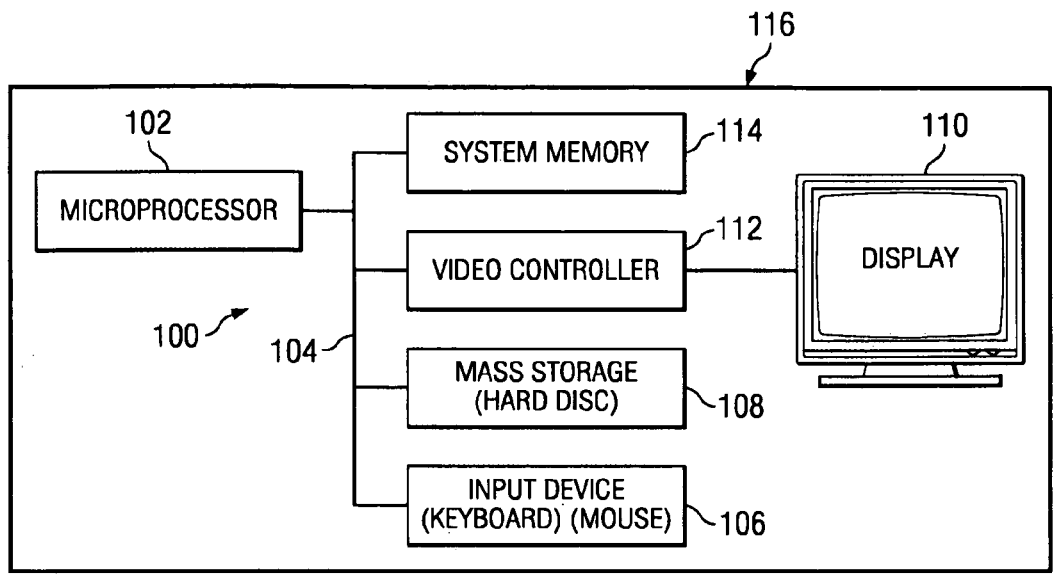
FIG. 1 is a schematic view illustrating an embodiment of an information handling system.

In one embodiment, information handling system 100, FIG. 1, includes, a microprocessor 102, which is connected to a bus 104. Bus 104 serves as a connection between microprocessor 102 and other components of computer system 100. An input device 106 is coupled to microprocessor 102 to provide input to microprocessor 102. Examples of input devices include keyboards, touchscreens, and pointing devices such as mouses, trackballs and trackpads. Programs and data are stored on a mass storage device 108, which is coupled to microprocessor 102. Mass storage devices include such devices as hard disks, optical disks, magneto-optical drives, floppy drives and the like. Information handling system 100 further includes a display 110, which is coupled to microprocessor 102 by a video controller 112. A system memory 114 is coupled to microprocessor 102 to provide the microprocessor with fast storage to facilitate execution of computer programs by microprocessor 102. In an embodiment, a chassis 116 houses some or all of the components of information handling system 100. It should be understood that other buses and intermediate circuits can be deployed between the components described above and microprocessor 102 to facilitate interconnection between the components and the microprocessor.

Figure 2A:
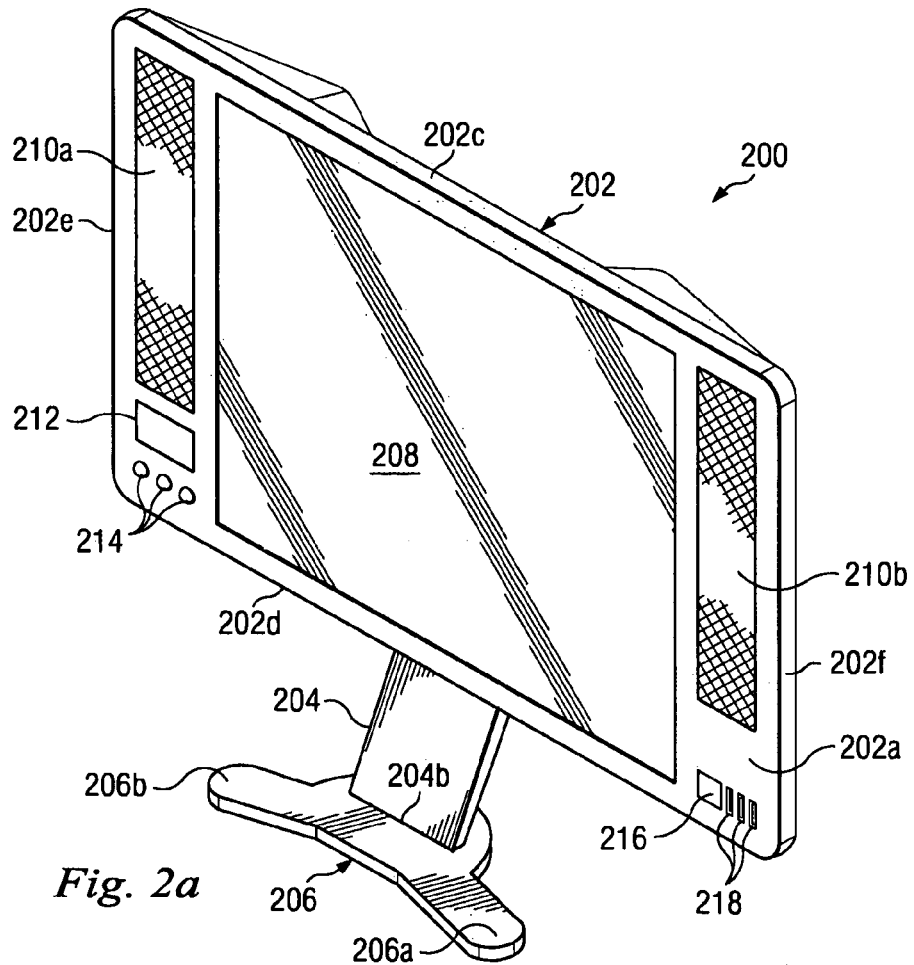
FIG. 2a is a front perspective view illustrating an embodiment of a mobile information handling system docking apparatus.
Figure 2B:
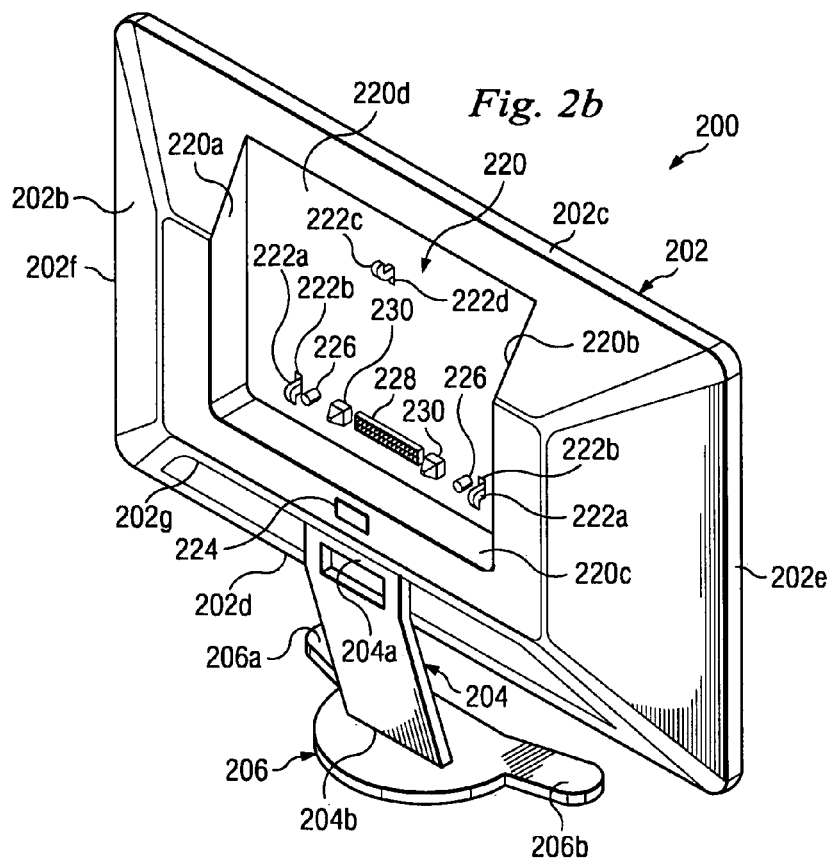

Referring now to FIGS. 2a and 2b, a mobile information handling system docking apparatus 200 is illustrated. The docking apparatus 200 includes a base 202 having a front surface 202a, a rear surface 202b located opposite the front surface 202a, a top surface 202c extending between the front surface 202a and the rear surface 202b, a bottom surface 202d located opposite the top surface 202c and extending between the front surface 202a and the rear surface 202b, a side surface 202e extending between the front surface 202a, the rear surface 202b, the top surface 202c, and the bottom surface 202d, and a side surface 202f located opposite the side surface 202e and extending between the front surface 202a, the rear surface 202b, the top surface 202c, and the bottom surface 202d. A stand surface 202g is located adjacent the rear surface 202b, between the side surfaces 202e and 202f, and proximate the bottom surface 202d. A stand support 204 extends from the stand surface 202g and includes a top end 204a coupled to the stand surface 202g and a bottom end 204b which is coupled to a stand base 206. The stand base 206 includes a plurality of support arms 206a and 206b which extend from the stand base 206 in an angularly spaced apart orientation.

A display device 208 is included in the base 202 and located on the front surface 202a of the base 202. In an embodiment, the display device 208 includes a conventional liquid crystal display (LCD) device known in the art. A plurality of speakers 210a and 210b are included in the base 202 and located in a spaced apart orientation on the front surface 202a of the base 202 on either side of the display device 208 such that the speaker 210a is adjacent the side surface 202e of the base 202 and the speaker 210b is adjacent the side surface 202f of the base 202. A plurality of display controls 212 are included on the front surface 202a of the base 202 adjacent the side surface 202e and the speaker 210a and, in an embodiment, include a power button, a volume button, a channel button, and/or a variety of other display controls known in the art. A plurality of video inputs 214 are included on the front surface 202a of the base 202 adjacent the side surface 202e and the display controls 212 and, in an embodiment, are operable to couple to conventional composite cables, component video cables, and/or a variety of other video cables known in the art. A remote sensor 216 is included on the front surface 202a of the base 202 adjacent the side surface 202f and the speaker 210b and is operable to receive signals from conventional remote controlling devices known in the art. A plurality of peripheral device inputs 218 are included on the front surface 202a of the base 202 adjacent the side surface 202f and the speaker 210b and, in an embodiment, include a plurality of universal serial bus (USB) connectors.

An information handling system channel 220 is defined by a plurality of side walls 220a and 220b, a bottom wall 220c, and a channel wall 220d on the base 202 such that the information handling system channel 220 is centrally located adjacent the rear surface 202b of the base 202. A plurality of securing members 222a are resiliently positioned in a plurality of respective channels 222b which are defined by the base 202 and located on the channel wall 220d. Each securing member 222a is resiliently positioned in its respective channel 222b such that it is free to move through its respective channel 222b upon application of a force to the securing member 222a. A securing member 222c is resiliently positioned in a channel 222d which is defined by the base 202 and located on the channel wall 220d. The securing member 222c is resiliently positioned in its respective channel 222d such that it is free to move through the channel 222d upon application of a force to the securing member 222c. The securing member 222c is oriented opposite the plurality of securing members 222a such that the resilient movement of the securing members 222a and the securing member 222c are in opposite directions. A securing member release 224 is located on the rear surface 202b of the base 202 and is operable to move the securing members 222a and 222c through their respective channels 222b and 222d. A plurality of aligning members 226 extend from the channel wall 220d and are located adjacent the securing members 222a. A docking connector 228 extends from the channel wall 220d and is centrally located between the securing members 222a in the information handling system channel 220. A plurality of aligning members 230 extend from the channel wall 220d and are located on opposite sides of the docking connector 228.

Figure 2C:
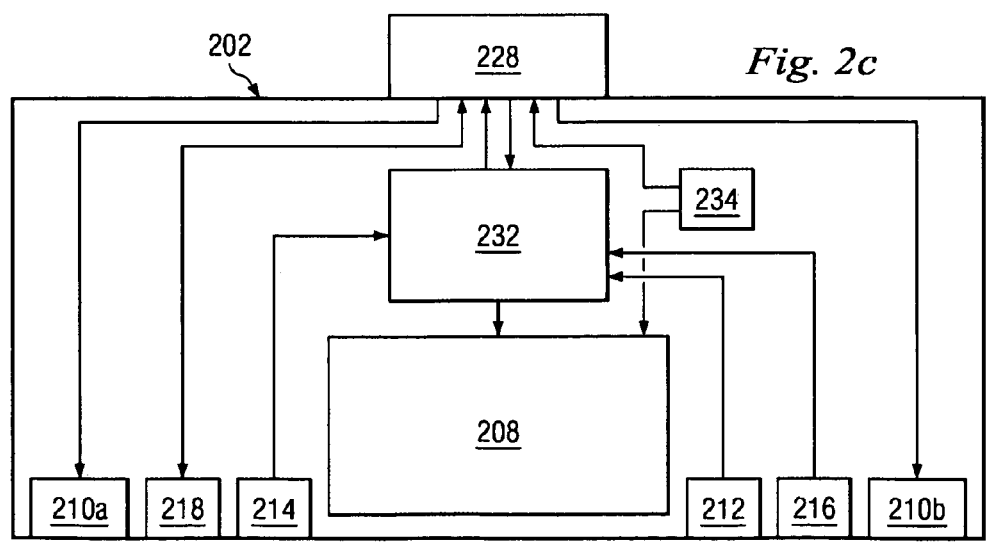
FIG. 2c is a schematic view illustrating an embodiment of the mobile information handling system docking apparatus of FIGS. 2a and 2b.

Referring now to FIG. 2c, the base 202 also houses a display electronics device 232 and is coupled to a power supply 234. In an embodiment, the base 202 may include a cable (not shown) for coupling the base 202 to a conventional power supply. The power supply 234 is coupled to and operable to send power to the docking connector 228 and the display device 208. The display electronics device 232 is coupled to and operable to send signals to and receive signals from the docking connector 228. The display electronics device 232 is coupled to and operable to receive signals from the video inputs 214. The display electronics device 232 is coupled to and operable to send signals to the display device 208. The display electronics device 232 is coupled to and operable to receive signals from the display controls 212. The display electronics device 232 is coupled to and operable to receive signals from the remote sensor 216. The docking connector 228 is coupled to and is operable to send signals to the speakers 210a and 210b. The docking connector 228 is coupled to and operable to send signals to and receive signals from the peripheral device inputs 218.

Figure 3A:
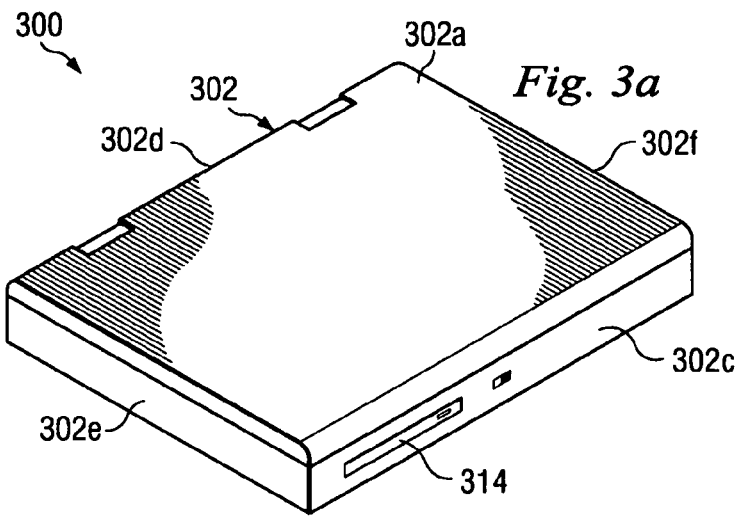
FIG. 3a is a top perspective view illustrating an embodiment of a mobile information handling system used with the mobile information handling system docking apparatus of FIGS. 2a, 2b, and 2c.
Figure 3B:
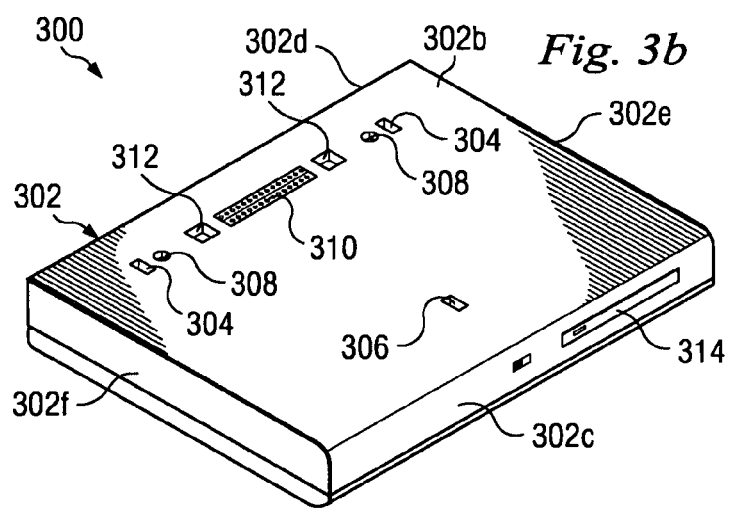
FIG. 3b is a bottom perspective view illustrating an embodiment of a mobile information handling system used with the mobile information handling system docking apparatus of FIGS. 2a, 2b, and 2c.

Referring now to FIGS. 3a and 3b, a mobile information handling system 300 is illustrated. The mobile information handling system 300 includes a chassis 302 having a top surface 302a, a bottom surface 302b located opposite the top surface 302a, a front surface 302c extending between the top surface 302a and the bottom surface 302b, a rear surface 302d located opposite the front surface 302c and extending between the top surface 302a and the bottom surface 302b, and a plurality of opposing sides surfaces 302e and 302f extending between the top surface 302a, the bottom surface 302b, the front surface 302c, and the rear surface 302d. In an embodiment, the mobile information handling system 300 may be the information handling system 100, described above with reference to FIG. 1, and the chassis 300 may be the chassis 116, described above with reference to FIG. 1. In an embodiment, the mobile information handling system 300 may be a conventional notebook computer known in the art. A plurality of securing member channels 304 are defined by the chassis 302 and located on the bottom surface 302b of the chassis 302 in a spaced apart relationship adjacent the side surfaces 302e and 302f and the rear surface 302d. A securing member channel 306 is defined by the chassis 302 and located on the bottom surface 302b of the chassis 302 adjacent the front surface 302c. A plurality of aligning apertures 308 are defined by the chassis 302 and located on the bottom surface 302b of the chassis 302 and adjacent the securing member channels 304. A docking connector 310 is defined by the chassis 302 and located on the bottom surface 302b of the chassis 302 and substantially centrally located between the securing member channels 304. A plurality of aligning apertures 312 are defined by the chassis 302 and located on the bottom surface 302b of the chassis 302 in a spaced apart relationship on opposite sides of the docking connector 310. A media bay 314 is housed by the chassis 302 and accessible from the front surface 302c of the chassis 302. In an embodiment, the media bay 314 may include, for example, a DVD player, a CD player, and/or a variety of media bays known in the art.

Figure 4A:
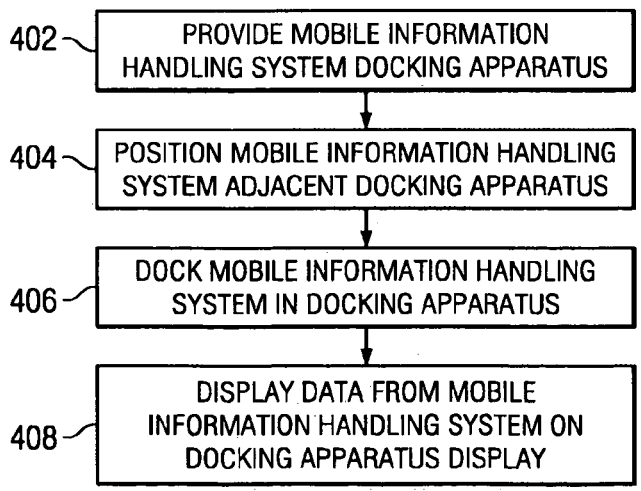
FIG. 4a is a flow chart illustrating an embodiment of a method for docking a mobile information handling system.
Figure 4B:
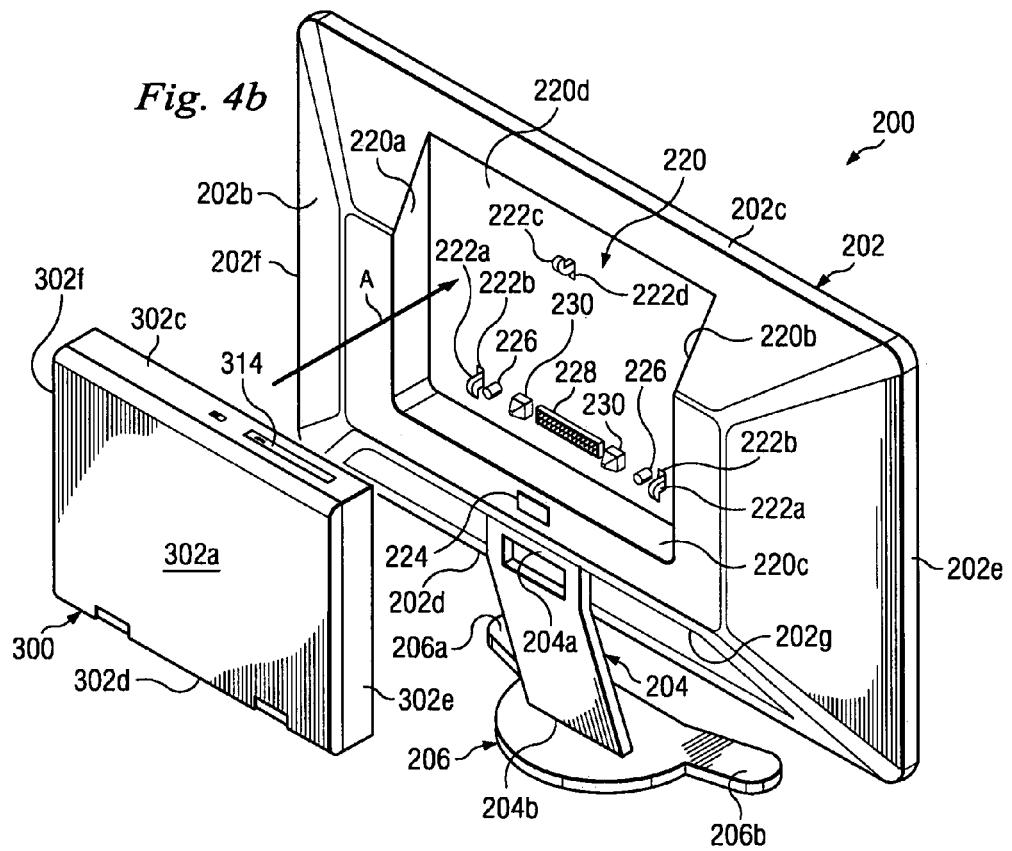
FIG. 4b is a perspective view illustrating an embodiment of the mobile information handling system of FIGS. 3a and 3b being docked with the mobile information handling system docking station of FIGS. 2a, 2b, and 2c.

Referring now to FIGS. 2a, 2b, 2c, 3a, 3b, 4a, and 4b, a method 400 for docking a mobile information handling system is illustrated. The method 400 begins at step 402 where the mobile information handling system docking apparatus 200, described above with reference to FIGS. 2a, 2b, and 2c, is provided. In an embodiment, the docking apparatus 200 by itself may function as a stand alone display. The method 400 then proceeds to step 404 where the mobile information handling system 300, described above with reference to FIGS. 3a and 3b, is positioned adjacent the docking apparatus 200. The mobile information handling system 300 is positioned adjacent the docking apparatus 200 with the bottom surface 302b on the chassis 302 of mobile information handling system 300 positioned immediately adjacent the information handling system channel 220 on the docking apparatus 200 such that the side surface 302e on the chassis 302 is adjacent the side wall 220b on the docking apparatus 200, the side surface 302f on the chassis 302 is adjacent the side wall 220a on the docking apparatus 200, the rear surface 302d on the chassis 302 is adjacent the bottom wall 220c on the docking apparatus 200, the securing member channel 306 on the chassis 302 is adjacent the securing member 222c on the docking apparatus 200, the securing member channels 304 on the chassis 302 are adjacent the securing members 222a on the docking apparatus 200, the aligning apertures 308 on the chassis 302 are adjacent the aligning members 226 on the docking apparatus 200, the aligning apertures 312 on the chassis 302 are adjacent the aligning members 230 on the docking apparatus 200, and the docking connector 310 on the chassis 302 is adjacent the docking connector 228 on the docking apparatus 200, as illustrated in FIG. 4b.

Referring now to FIGS. 2a, 2b, 2c, 3a, 3b, 4a, 4b, and 4c, the method 400 then proceeds to step 408 where the mobile information handling system 300 is docked in the docking apparatus 200. The mobile information handling system 300 is moved in a direction A, illustrated in FIG. 4b, such that the aligning members 226 matingly engage the aligning apertures 308 and the aligning members 230 matingly engage the aligning apertures 312 in order to ensure proper alignment of the securing members 222a and 222c with the securing member channels 304 and 306, respectively, and the docking connector 228 with the docking connector 310. Further movement of the mobile information handling system 300 in the direction A results in the mating engagement of the docking connector 228 with the docking connector 310, the engagement of the securing members 222a with the securing member channels 304, and the engagement of the securing member 222c with the securing member channel 306. Due to the securing members 222a and 222c being operable to move resiliently in the channels 222b and 222d, respectively, the movement of the mobile information handling system 300 in the direction A allows the securing members 222a and 222c to move into the securing member channels 304 and 306, respectively, which secures the mobile information handling system 300 to the docking apparatus 200. With the mobile information handling system 300 secured in the docking apparatus 200, as illustrated in FIG. 4c, the docking connector 228 on the docking apparatus 200 is fully matingly engaged with the docking connector 310 on the mobile information handling system 300, and the media bay 314 on the front surface 302c of the mobile information handling system 300 is accessible. In an alternative embodiment, the media bay 314 may be located, for example, on one of the side surfaces 320e and/or 302f of the mobile information handling system 300, and the dimensions of the base 202 of the docking apparatus 200 may be modified from those illustrated in FIGS. 2a and 2b in order to allow access to the media bay 314 when the mobile information handling system 300 is docked in the docking apparatus 200.

Figure 4D:
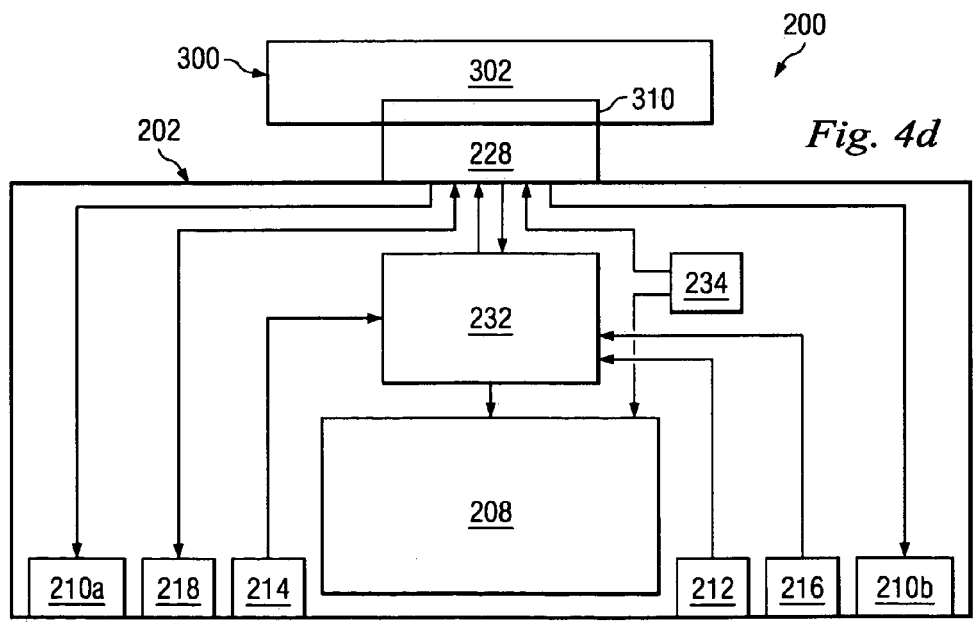
FIG. 4d is a schematic view illustrating an embodiment of the mobile information handling system of FIGS. 3a and 3b docked with the mobile information handling system docking station of FIGS. 2a, 2b, and 2c.

Referring now to FIGS. 4a and 4d, the method 400 then proceeds to step 408 where display data from the mobile information handling system 300 is displayed on the display device 208 of the docking apparatus 200. In an embodiment, the docking connector 228 functions as a conventional port replicator within the docking apparatus 200, communicating with the display electronics device 232 using industry standard digital display output and display control protocols such as, for example, MCCS. With docking connector 228 on the docking apparatus 200 engaged with the docking connector 310 on the mobile information handling system 300, as illustrated in FIG. 4d, the display electronics device 232 is coupled to and operable to send signals to and receive signals from the mobile information handling system 300, such that the mobile information handling system 300 is coupled to and operable to receive signals from the video inputs 214, coupled to and operable to send signals to the display device 208, coupled to and operable to receive signals from the display controls 212, and coupled to and operable to receive signals from the remote sensor 216. Furthermore, the mobile information handling system 300 is coupled to and is operable to send signals to the speakers 210a and 210b, and the mobile information handling system 300 is coupled to and operable to send signals to and receive signals from the peripheral device inputs 218. With the mobile information handling system 300 docked in the docking apparatus 300, data from the mobile information handling system 300 may then be displayed on the display device 208 on the docking apparatus 200. In an embodiment, with the mobile information handling system 300 docked in the docking apparatus 200, the combination docking apparatus 200 and mobile information handling system 300 may function as, for example, an all-in-one personal computer, a media center, a jukebox, and/or a DVD player. In an embodiment, the coupling of peripheral devices such as, for example, a keyboard, a mouse, a printer, and/or a variety of other peripheral devices known in the art, to the docking apparatus 200 allow a user to utilize the mobile information handling system 300 as a conventional desktop information handling system. The mobile information handling system 300 may be undocked from the docking apparatus 200 by activating the securing member release 224, which moves the securing members 222a and 222c through their respective channels 222b, and 222d and allows the securing members 222a and 222c to be removed from the securing member channels 304 and 306, respectively, and the mobile information handling system 300 to be removed from the docking apparatus 200. Thus, a mobile information handling system docking apparatus 200 is provided which allows a mobile information handling system 300 to be docked and utilized as a conventional desktop information handling system while using less space relative to what is required by conventional mobile information handling system docking stations and eliminating the cables required by conventional mobile information handling system docking stations.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A mobile information handling system (IHS) docking apparatus, comprising:
    a base defining an IHS channel that is dimensioned to accept a mobile IHS comprising a first display device;
    a second display device located on the base; and
    an IHS docking connector located on the base and operable to couple to the mobile IHS when the mobile IHS is positioned in the IHS channel.

2. The apparatus of claim 1, wherein the second display device is located on a first surface of the base that faces a first direction and the IHS channel is located on a second surface of the base that is located opposite the first surface, wherein the second surface faces a second direction that is substantially opposite to the first direction.

3. The apparatus of claim 1, wherein the IHS docking connector extends from the base and into the IHS channel.

4. The apparatus of claim 1, wherein a stand extends from the base.

5. The apparatus of claim 1, further comprising:
    at least one securing member located on the base and extending into the IHS channel.

6. The apparatus of claim 1, further comprising:
    at least one aligning member located on the base and extending into the IHS channel.

7. The apparatus of claim 1, further comprising:
    at least one peripheral device coupler located on the base and coupled to the IHS docking connector.

8. The apparatus of claim 1, further comprising:
    a mobile IHS located in the IHS channel, secured to the base, and coupled to the IHS docking connector.

9. The apparatus of claim 8, wherein the IHS channel comprises dimensions such that a media bay on the mobile information handling system is accessible.

10. An information handling system (IHS), comprising:
    a chassis comprising a first display device;
    a processor housed in the chassis and coupled to the first display device;
    a first docking connector located on the chassis and coupled to the processor; and
    a docking apparatus comprising a second display device and a second docking connector located on the docking apparatus, wherein the chassis is connected to the docking apparatus and the first docking connector is coupled to the second docking connector such that the processor is coupled to the second display device.

11. The system of claim 10, wherein the second display device is located on a first surface of the docking apparatus that faces a first direction and the second docking connector is located on a second surface of the docking apparatus that is opposite the first surface, wherein the second surface faces a second direction that is substantially opposite to the first direction.

12. The system of claim 10, wherein the second docking connector extends from the docking apparatus and matingly engages the first docking connector.

13. The system of claim 10, wherein the docking apparatus defines an IHS channel comprising dimensions sufficient to house the chassis, wherein the chassis is located in the IHS channel.

14. The system of claim 13, wherein the IHS channel comprises dimensions such that a media bay on the mobile IHS is accessible.

15. The system of claim 10, further comprising:
    at least one securing member located on the docking apparatus and engaging the chassis to secure the chassis to the docking apparatus.

16. The system of claim 10, further comprising:
    at least one aligning member located on the docking apparatus and engaging the chassis.

17. The system of claim 10, further comprising:
    at least one peripheral device coupler located on the docking apparatus and coupled to the processor through the first docking connector and the second docking connector.

18. The system of claim 10, wherein a stand extends from the docking apparatus.

19. A method for docking a mobile information handling system (IHS), comprising:
    providing a docking apparatus comprising a first display device and a first docking connector located on the docking apparatus;
    positioning a mobile IHS comprising a second display device and a second docking connector adjacent the docking apparatus; and
    docking the mobile IHS by connecting the mobile IHS to the docking apparatus and coupling the first docking connector to the second docking connector.

20. The method of claim 19, further comprising:
    displaying data from the mobile IHS on the first display device.

21. A docking apparatus comprising:
    a display device supported in an upright position by a stand;
    a first side of the display device facing a first direction and including a first display;
    a second side of the display device, opposite the first side and facing a second direction that is opposite the first direction, including a channel recessed into the second side and dimensioned to accept a mobile information handling system (IHS) comprising a second display; and
    a docking connector mounted in the channel and operable to couple to the mobile IHS when the mobile IHS is positioned in the channel.

22. The apparatus of claim 21 further comprising:
    a plurality of securing members mounted in the channel.

23. The apparatus of claim 21 further comprising:
    a plurality of aligning members mounted in the channel.

24. A method of docking a mobile information handling system (IHS) comprising:
    supporting a display device in an upright position by a stand, the display device comprising
    a first display on a first side of the display device, a channel on a second side of the display device, the first side and the second side facing in substantially opposite directions, and a first docking connector located in the channel;
    inserting a mobile IHS comprising a second display in the channel; and
    connecting a second docking connector of the mobile IHS to the first docking connector.

* * * * *

UNITED STATES PATENT AND TRADEMARK OFFICE
CERTIFICATE OF CORRECTION

| | | |
|---|---|---|
| PATENT NO. | : 7,471,511 B2 | Page 1 of 1 |
| APPLICATION NO. | : 11/334162 | |
| DATED | : December 30, 2008 | |
| INVENTOR(S) | : Bruce C. Montag et al. | |

It is certified that error appears in the above-identified patent and that said Letters Patent is hereby corrected as shown below:

Claim 24, Column 8, Lines 49-61, delete the entire Claim 24 and insert new Claim 24
--A method of docking a mobile information handling system (IHS) comprising:
  supporting a display device in an upright position by a stand, the display device comprising:
    a first display on a first side of the display device, a channel on a second side of the display device, the first side and the second side facing in substantially opposite directions, and a first docking connector located in the channel;
  inserting a mobile IHS comprising a second display in the channel; and
  connecting a second docking connector of the mobile IHS to the first docking connector.--

Signed and Sealed this

Fifth Day of May, 2009

JOHN DOLL
*Acting Director of the United States Patent and Trademark Office*